3,058,959
ACRYLATE ESTER-VINYL PYRIDINE N-OXIDE COPOLYMERS
Frederick E. Bailey, Jr., Charleston, and Walter J. Toussaint, South Charleston, W. Va., assignors to Union Carbide Corporation, a corporation of New York
No Drawing. Filed June 18, 1959, Ser. No. 821,096
3 Claims. (Cl. 260—86.1)

This invention relates to novel compositions comprising polymerized compounds particularly suitable for use as viscosity index improvers and engine sludge dispersants in lubricating oil compositions. More particularly, this invention relates to novel copolymers comprising esters of acrylic acid and lower-alkyl substituted vinylpyridine N-oxides. This invention also relates to lubricating oil compositions containing the new copolymers as additives and viscosity index improvers.

The art of adding additives to lubricating oil compositions adapted for use in internal combustion engines is well known to those versed in this field and has resulted in substantial improvements in lubricants. However, in view of the extent to which motor transport is a dominating feature of our existence, the search for useful additives for lubricating oil compositions is a never-ending one and hence this art is in a constant and necessary state of flux. It is with this art that this invention is primarily concerned.

The novel copolymers of this invention comprise, as polymeric components thereof, between 85 percent and 97 percent by weight of an ester of acrylic acid and an aliphatic alcohol containing from 8 to 18 carbon atoms, and between 3 and 15 percent of a vinylpyridine N-oxide or a lower-alkyl substituted vinylpyridine N-oxide, the aggregate sum of the acrylate ester and the vinylpyridine N-oxide being substantially 100%.

As used throughout this specification, the term "lower-alkyl" relates to alkyl groups containing from one to six carbon atoms and in addition, terms vinylpyridine N-oxide and lower-alkyl substituted vinylpyridine N-oxide include both the hydrated and anhydrous forms. The dihydrate form, being more stable, is preferred.

The novel copolymers of this invention have been found to be useful additives for lubricating oil compositions. More specifically, the novel copolymers of this invention have been found to be particularly effective as viscosity index improvers and engine sludge dispersants. Lubricating compositions, therefore, containing the copolymers of this invention as additives therein, are also within the contemplation and scope of this invention.

A preferred copolymer additive of this invention resides in polymeric components consisting of, by weight of the copolymer, 85% to 97% of an octyl or decyl acrylate and 3% to 15% of a lower-alkyl substituted vinylpyridine N-oxide dihydrate.

Another preferred copolymer additive of this invention resides in polymeric components consisting of, by weight of the copolymer, 88% to 94% isodecyl acrylate and 6% to 12% of 2-methyl-5-vinylpyridine N-oxide dihydrate.

A particularly preferred copolymer additive of this invention is one in which the polymeric components consist of, by weight of the copolymer, between about 93 and 95% 2-ethylhexyl acrylate and between about 5 and 7% 2-methyl-5-vinylpyridine N-oxide dihydrate.

The esters of acrylic acid employed in the formation of the novel copolymers of this invention, may be prepared by reaction of acrylic acid and alcohols under conventional esterification conditions. The vinylpyridine N-oxides also employed in the formation of the novel copolymers of this invention, may be prepared by the processes described in U.S. Patent 2,749,349 or other methods described in the literature.

The esters of acrylic acid suitable for use in forming the novel copolymers of this invention have the following general formula:

$$CH_2=CHCOOR$$

in which R represents an alkyl radical containing from about 8 to about 18 carbon atoms. Illustrative of such esters are:

2-ethylhexyl acrylate
Iso-decyl acrylate
Capryl acrylate
Lauryl acrylate
Myristyl acrylate
Cetyl acrylate
Stearyl acrylate
Nonyl acrylate
Undecyl acrylate and the like The vinylpyridine N-oxides suitable for use in forming the novel copolymers of this invention have the following general formula:

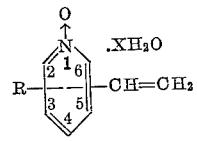

in which R represents a hydrogen atom or a lower-alkyl radical containing up to 6 carbon atoms, the vinyl and R groups occupying the 2 and 5 positions of the ring, either the vinyl or the R groups being in the 2 position, and X is a number from 0 to 2 inclusive.

Illustrative of said compounds in their hydrated form are:

2-vinylpyridine N-oxide dihydrate
2-methyl-5-vinylpyridine N-oxide dihydrate
5-ethyl-2-vinylpyridine N-oxide dihydrate The copolymers of this invention may be prepared by conventional bulk, solution or dispersion methods. Preferably, the novel copolymers of this invention may be prepared by reacting 70 to 97 parts by weight of an above described ester of acrylic acid and an aliphatic alcohol with 30 to 3 parts by weight of an above-described vinylpyridine N-oxide at a temperature of 20 to 120° C. and preferably 40 to 80° C. The above reaction can be carried out advantageously at pressures of up to 200 p.s.i. although a range of atmospheric to 100 p.s.i. is preferred. The reaction may be conducted in the presence of 0 to 80% by weight of an inert solvent and in the presence of a polymerization catalyst. Among the solvents that may be employed are acetone, benzene, toluene, pentane, heptane and the like. Among the polymerization catalysts that may be employed are diacetyl peroxide, lauryl peroxide, isopropyl percarbonate, azobisisobutyronitriles and the like. The quantity of solvent or catalyst that must be employed in forming the novel copolymers of this invention is not critical. The quantity of solvent ranges from none in a bulk polymerization to about 80 to 90% based on total charge. The quantity of catalyst ranges from about 0.1 to 2% based on monomer.

In the procedure described above for the copolymerization of the aforementioned starting materials, a variety of the novel copolymers with which this invention is concerned are readily prepared and include:

(a) 2-methyl-5-vinylpyridine N-oxide dihydrate and isodecyl acrylate
(b) 5-ethyl-2-vinylpyridine N-oxide dihydrate and 2-ethylhexyl acrylate
(c) 2-vinylpyridine N-oxide dihydrate and lauryl acrylate.

The novel additives of this invention are not only characterized by the percentages of the components comprising said copolymers but are also characterized by the reduced viscosities obtained thereby of between 0.2 and 1.5. As is known in polymer art, reduced viscosity can be taken as a measure of molecular weight. It is defined as the specific viscosity divided by the concentration of polymer in grams per 100 ml. solvent. The specific viscosity is the quotient of the difference of the viscosity of the solution and that of the pure solvent divided by the viscosity of the pure solvent. The reduced viscosity is obtained by dividing the specific viscosity by the concentration of polymer in the test solution in grams per 100 ml. of solvent. In this invention reduced viscosities of solutions containing 0.2 g. polymer per 100 ml. of benzene were measured at 30° C.

The following examples will serve to illustrate the practice of the invention:

EXAMPLE 1

To a Pyrex glass pressure bottle, 2.5 grams 2-methyl-5-vinylpyridine N-oxide dihydrate, 47.5 grams 2-ethylhexyl acrylate, 15 ml. dimethylformamide and 0.5 gram diacetyl peroxide were charged. The contents in said bottle were capped under nitrogen and subjected to mild agitation in a 50° C. water bath for 90 hours. At the end of this time, the product was removed from the bottle, washed with methanol and dried. By analysis, the product was found to be a polymer consisting of about 88.5 percent by weight 2-ethyl-hexyl acrylate and 11.5 percent by weight 2-methyl-5-vinylpyridine N-oxide dihydrate, and had a reduced viscosity in a benzene solution of 0.38.

A 2.0 percent solution in "Gulf Security Oil A" had viscosities of 46.7 centistokes at 100° F. and 7.4 centistokes at 210° F. from which a viscosity index of 126.5 was calculated.

"Gulf Security Oil A" is a solvent refined petroleum oil having viscosities of 34.0 centistokes at 100° F. and 5.4 centistokes at 210° F., from which a viscosity index of 100 is calculated.

EXAMPLE 2

To a Pyrex glass pressure bottle, 2.5 grams of 2-methyl-5-vinylpyridine N-oxide dihydrate, 47.5 grams 2-ethylhexyl acrylate, 5 ml. dimethylformamide and 1 percent diacetyl-peroxide based on monomer weight, were charged. Following the procedure in Example 1, after 94 hours a resinous copolymer was recovered at 69 percent conversion. This copolymer had a reduced viscosity in benzene solution of 0.62. A 2.0 percent solution in "Gulf Security Oil A" had viscosities of 53.76 centistokes at 100° F. and 8.62 centistokes at 210° F. from which a viscosity index of 133.5 was calculated.

The novel copolymers of this invention may be added to lubricating oil compositions to impart a lower rate of change of viscosity with temperature change thereby. This highly desirable result is obtained by adding the additive of this invention to the lubricating oil composition so that the former constitutes a minor portion thereof and the latter a major portion thereof of the total lubricant-additive mixture. Preferably, the additive is present in percentages of from 0.10 to 15% by weight of the lubricating oil composition. However, a percentage of 1 to 3% is particularly preferred.

An additive which is to serve as a dispersant for carbonaceous material in a crank case lubricant formulation must function under a variety of conditions. A severe test of such an additive is its dispersancy action in the presence of moisture. In a cold engine moisture can condense in the crank case or engine parts, and the dispersant must function in the presence of small amounts of water in the oil if highly undesirable deposition of sludge is to be prevented. An outstanding property of the polymeric dispersants of the subject invention is their ability to remain highly effective in the presence of moisture. Additionally, these polymeric compositions impart highly improved viscosity index to the lubricating oil in which they are formulated. These unique properties are made clear in the following.

Judgment of the suitability of a lubricating oil composition for use over a wide range of operating temperatures is afforded by the "viscosity index" of the oil which is calculated from the measured viscosities (expressed in centistokes) of the lubricating composition at 100° F. and 210° F. by the standard A.S.T.M. method, D–567–41.

The following table (I) illustrates the outstanding behavior of the novel copolymers of this invention. Two lubrication compositions containing novel copolymers of this invention (hereinafter represented by "A" and "B" respectively) are prepared as follows: To a quantity of a lubricating oil there is added one percent of a copolymer containing 95% 2-ethylhexyl acrylate and 5% 2-methyl-5-vinylpyridine N-oxide dihydrate. In "A" composition, the copolymer has a reduced viscosity of 0.38. In "B" composition, the copolymer has a reduced viscosity of 0.62. A quantity, comprising 2% of the composition, of a proprietary oxidation-corrosion inhibitor is also added to each of the lubricating compositions.

Composition "A" and "B" were then compared with a control lubricating composition containing a proprietary oxidation-corrosion inhibitor and no additive.

Table I
VISCOSITY OF "GULF SECURITY OIL A" FORMULATIONS

| Viscosity Improver-Dispersant Additive | Viscosity | | | | Viscosity Index |
|---|---|---|---|---|---|
| | 100° F. | | 210° F. | | |
| | cs. | SUS units | cs. | SUS units | |
| Control | 34.1 | 160 | 5.43 | 44.0 | 103 |
| A | 40.4 | 188 | 6.44 | 47.3 | 119 |
| B | 43.4 | 202 | 6.86 | 48.7 | 122 |

To illustrate further the results of Table I, the following comparisons were made between compositions "A" and "B" (defined above) and another control lubricating composition. An additional lubricating composition "C": prepared in the same manner as "A" and "B" but containing a copolymer consisting of 95% 2-ethylhexyl acrylate and 5% 2-methyl-5-vinyl-pyridine N-oxide dihydrate having a reduced viscosity of 0.76, was also employed. The results are tabulated below:

Table II

| Additive | Additive (percent) by weight | Viscosity | | | | Viscosity Index |
|---|---|---|---|---|---|---|
| | | 100° F. | | 210° F. | | |
| | | cs. | SUS units | cs. | SUS units | |
| Control | | 46.8 | 199 | 6.44 | 47.3 | 110 |
| A | 1.6 | 54.8 | 254 | 7.95 | 52.3 | 119 |
| | 2.4 | 61.6 | 286 | 9.01 | 55.9 | 125 |
| B | 0.8 | 51.3 | 238 | 7.45 | 50.6 | 115 |
| | 1.6 | 61.0 | 283 | 8.95 | 55.7 | 125 |
| | 2.4 | 70.7 | 328 | 10.55 | 61.3 | 131 |
| C | 0.8 | 52.9 | 246 | 7.76 | 51.7 | 119 |
| | 1.6 | 65.0 | 301 | 9.77 | 58.5 | 130 |
| | 2.4 | 77.6 | 359 | 11.78 | 65.7 | 135 |

The following data represented by Table III further illustrates the outstanding behavior of the novel copolymers of this invention in respect to their carbon-dispersing properties. Representative member "C" described above was employed as were representative additives. The dispersion test procedure comprised dispersing about 3 grams of carbon paste in 57 grams of kerosene (with or without dissolved additive) in a device providing vigorous agitation to obtain good mixing. When water was to be included 0.3 ml. was added after the critical agitation and mixing was then continued for 1 additional minute. The carbon suspension was immediately transferred to a 50 ml. graduated cylinder (or equivalent). Observation was then made with transmitted light.

Table III

| Additive | Additive Concentration, Percent by wgt. | Percent Carbon Suspended | | | |
|---|---|---|---|---|---|
| | | Dry | | 0.5% water | |
| | | 72 hrs. | 144 hrs. | 72 hrs. | 144 hrs. |
| None | | 48 | 46 | 56 | 55 |
| Commercial Proprietary Index Improver detergent [1] | 0.4 | 100 | 100 | 37 | 36 |
| Commercial Proprietary detergent [2] | 0.4 | 58 | 46 | 50 | 46 |
| Commercial Proprietary detergent [3] | 0.4 | 50 | 44 | 52 | 43 |
| Dispersant [4] "C" | 0.4 | 100 | 100 | 100 | 100 |

[1] A viscosity index improver dispersant of the polymeric methacrylate type.
[2] A barium dinonylnaphthalene sulfonate, neutral, 50% in solvent which is extracted coastal type petroleum oil.
[3] A sodium dinonylnaphthalene sulfonate 50% in solvent which is extracted coastal type petroleum oil.
[4] Additive is a copolymer of this invention as described above.

The following data, illustrates the oxidative stability of the novel copolymers of this invention using representative members (A) (B) and (C).

Table IV
OXIDATION OF VI IMPROVER-DISPERSANT ADDITIVES

| VI Improver-Dispersant Additive | Viscosity Change, cs. | | VI Change |
|---|---|---|---|
| | 100° F. | 210° F. | |
| None [1] | +2.6 | +0.23 | 0 |
| 1.0% "A" | +3.0 | +0.26 | −2 |
| 1.0% "B" | +2.4 | +0.31 | +1 |
| 1.0% "C" | +2.0 | +0.22 | 0 |
| 5.56% [2] | −0.5 | −0.29 | −5 |
| 2.5% [3] | +1.5 | −0.10 | −7 |

[1] A proprietary-oxidation corrosion inhibitor was added throughout using Gulf "Security Oil A" as base stock.
[2] A commercial VI improver-dispersant which is of the polymeric methacrylate type.
[3] Another commercial VI improver-dispersant which is of the polymeric methacrylate type.

The following data illustrates shear stability results taken with copolymer "C" of this invention and with a commercial viscosity improver-dispersant. Shear stability is determined by passing the sample of test fluid through an orifice with a pressure drop of 100 p.s.i. for an arbitrary number of passes. In these tests 2,000 passes of the samples were made. Under these conditions, high molecular weight solutes will break up into smaller units. The viscosity changes are a measure of such break down.

Table V
SHEAR TEST DATA FOR VISCOSITY IMPROVER-DISPERSANT

| VI Improver-Dispersant Additive | Viscosity Change, cs. | | Viscosity Change |
|---|---|---|---|
| | 100° F. | 210° F. | |
| None | −1.4 | −0.10 | +2 |
| 1.0% "C" | −5.7 | −0.99 | −9 |
| 5.56% [1] | −15.3 | −2.59 | −6 |

[1] A commercial VI improver-dispersant which is of the polymeric methacrylate type.

As can be seen by the foregoing data, the copolymers of this invention are not only excellent viscosity index improvers but also possess excellent carbon dispersing, oxidative and shear stability properties.

What is claimed is:

1. A copolymer, the polymeric components of which consist essentially of, by weight of the copolymer,
    (a) from about 85 percent to 97 percent of a copolymerized ester of acrylic acid and a saturated aliphatic monohydric alcohol having from 8 to 18 carbon atoms, and
    (b) from about 3 percent to 15 percent of a copolymerized vinylpyridine-N-oxide that is represented by the formula

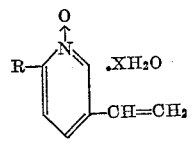

wherein R represents a radical selected from the group consisting of hydrogen and alkyl having from 1 to 6 carbon atoms, and wherein X represents a number having a value of from 0 to 2; wherein the said copolymer has a reduced viscosity of from 0.2 to 1.5 measured in a solution of 0.2 gram of copolymer per 100 milliliters of benzene at 30° C.

2. A copolymer, the polymeric components of which consist essentially of, by weight of the copolymer,
    (a) from about 85 to 97 percent of copolymerized octyl acrylate, and
    (b) from about 3 to 15 percent of copolymerized 2-methyl-5-vinylpyridine-N-oxide dihydrate; wherein the said copolymer has a reduced viscosity of from 0.2 to 1.5 measured in a solution of 0.2 gram of copolymer per 100 milliliters of benzene at 30° C.

3. A copolymer, the polymeric component of which consists essentially of, by weight of the copolymer,
    (a) from about 85 to 97 percent of copolymerized decyl acrylate, and
    (b) from about 3 to 15 percent of copolymerized 2-methyl-5-vinylpyridine-N-oxide dihydrate; wherein the said copolymer has a reduced viscosity of from 0.2 to 1.5 measured in a solution of 0.2 gram of copolymer per 100 milliliters of benzene at 30° C.

References Cited in the file of this patent
UNITED STATES PATENTS

| 2,586,238 | Lytton | Feb. 19, 1952 |
| 2,737,452 | Catlin et al. | Mar. 6, 1956 |
| 2,737,496 | Catlin | Mar. 6, 1956 |
| 2,749,349 | Cislak | June 5, 1956 |
| 2,827,359 | Kine et al. | Mar. 18, 1958 |
| 2,839,512 | Barnum et al. | June 17, 1958 |
| 2,889,282 | Lorensen et al. | June 2, 1959 |
| 2,958,682 | Schuller et al. | Nov. 1, 1960 |